United States Patent
Davis et al.

(10) Patent No.: US 11,251,940 B2
(45) Date of Patent: Feb. 15, 2022

(54) DECENTRALIZED REPOSITORY USING ENCRYPTION FOR NON-REPUDIABLE ACTIVITY AND OWNERSHIP

(71) Applicant: KYNDRYL, INC., New York, NY (US)

(72) Inventors: Michael C. Davis, Tampa, FL (US); Robert S. Milligan, Erlanger, KY (US); Gordan G. Greenlee, Endicott, NY (US); Christopher L. Molloy, Raleigh, NC (US); Steven A. Waite, Racine, WI (US)

(73) Assignee: Kyndryl, Inc., New York, NY (US)

(*) Notice: Subject to any disclaimer, the term of this patent is extended or adjusted under 35 U.S.C. 154(b) by 313 days.

(21) Appl. No.: 16/361,418

(22) Filed: Mar. 22, 2019

(65) Prior Publication Data
US 2020/0304298 A1    Sep. 24, 2020

(51) Int. Cl.
| | | |
|---|---|---|
| H04L 29/06 | (2006.01) | |
| H04L 9/08  | (2006.01) | |
| H04L 9/32  | (2006.01) | |
| H04L 9/30  | (2006.01) | |
| G06F 21/60 | (2013.01) | |
| H04L 9/06  | (2006.01) | |

(52) U.S. Cl.
CPC .......... *H04L 9/0825* (2013.01); *G06F 21/602* (2013.01); *H04L 9/0637* (2013.01); *H04L 9/30* (2013.01); *H04L 9/3218* (2013.01); *H04L 2209/38* (2013.01)

(58) Field of Classification Search
None
See application file for complete search history.

(56) References Cited

U.S. PATENT DOCUMENTS

| 5,745,574    | A  |   | 4/1998  | Muftic     |              |
|--------------|----|---|---------|------------|--------------|
| 6,367,013    | B1 |   | 4/2002  | Bisbee     |              |
| 2001/0034835 | A1 | * | 10/2001 | Smith      | H04L 9/3247  |
|              |    |   |         |            | 713/175      |
| 2002/0032856 | A1 |   | 3/2002  | Noguchi    |              |
| 2014/0013110 | A1 |   | 1/2014  | Thoniel    |              |
| 2016/0269179 | A1 |   | 9/2016  | White      |              |
| 2017/0317833 | A1 | * | 11/2017 | Smith      | H04L 9/3066  |
| 2017/0337534 | A1 | * | 11/2017 | Goeringer  | G06Q 20/123  |
| 2018/0046766 | A1 |   | 2/2018  | Deonarine  |              |
| 2018/0323979 | A1 |   | 11/2018 | Ahn        |              |

FOREIGN PATENT DOCUMENTS

JP    38196082 A    9/1999

OTHER PUBLICATIONS

Xia, Qi et al.; MeDShare: Trust-less medical data sharing among cloud service providers via blockchain; IEEE Access, vol. 5, 2017; Jul. 24, 2017; pp. 14757-14767.

\* cited by examiner

*Primary Examiner* — Andrew J Steinle
(74) *Attorney, Agent, or Firm* — Schmeiser, Olsen & Watts; Ken Han

(57) ABSTRACT

An approach is provided for deterring a tampering of content. Content is signed by using an asymmetric key cryptography. The signed content is stored in a distributed ledger which is accessible to a plurality of subscribers of the distributed ledger. The signing of the content using the asymmetric key cryptography together with the storing of the signed content in the distributed ledger provide a non-repudiable identification of an owner of the content and a non-repudiable proof of an ownership of the content.

14 Claims, 4 Drawing Sheets

DECENTRALIZED REPOSITORY USING ENCRYPTION FOR NON-REPUDIABLE ACTIVITY AND OWNERSHIP

BACKGROUND

The present invention relates to digital content management, and more particularly to a decentralized repository of content that provides non-repudiable identification and proof of ownership of the content and activity associated with the content.

Known content management techniques rely on server implementation to maintain validity of stored content items. The server promises validity of qualities such as the content is not modified, the owner of the content has not been tampered with, and proof of ownership of the content. The known content management system may support multi-user cooperation, file access control, automatic behavior, network support, version indication, historical reporting, and version announcement. While viewing a repository in a known content management system, change and change owner are known and this information is repudiable. Tampering with information in the repository, such as owner value, is not evident and the source of tampering is not discoverable. In an existing repository, a wrong owner of stored content can be indicated, thereby associating credit or blame to the wrong user.

In known repository systems, the identity of the owner and the trust of activities are validated by the system itself. The repository system is not safe against tampering. Identity and any activity supported by the repository system can be tampered with. For example, the user identity and/or the faulty source of a security bug can be tampered with to hide the cause of the problem. Tampering in known repository systems may occur to hide the source of a change, such as hiding the source for security backdoors. Once code is compiled, the source of a change can be erased from the version control system, while the executable file remains, which may be exploited by cyber attacks. Furthermore, known repository systems do not make changes to content immediately available to all users who access the repository systems. The versions in known repository systems are not cross validated and rely on a central authority.

SUMMARY

In one embodiment, the present invention provides a method of deterring a tampering of content. The method includes signing, by one or more processors, content by using an asymmetric key cryptography. The method further includes storing, by the one or more processors, the signed content in a distributed ledger which is accessible to a plurality of subscribers of the distributed ledger. The signing using the asymmetric key cryptography together with the storing the signed content in the distributed ledger provide a non-repudiable identification of an owner of the content and a non-repudiable proof of an ownership of the content.

In another embodiment, the present invention provides a computer program product for deterring a tampering of content. The computer program product includes a computer readable storage medium. Computer readable program code is stored in the computer readable storage medium. The computer readable program code is executed by a central processing unit (CPU) of a computer system to cause the computer system to perform a method. The method includes the computer system signing content by using an asymmetric key cryptography. The method further includes the computer system storing the signed content in a distributed ledger which is accessible to a plurality of subscribers of the distributed ledger. The signing using the asymmetric key cryptography together with the storing the signed content in the distributed ledger provide a non-repudiable identification of an owner of the content and a non-repudiable proof of an ownership of the content.

In another embodiment, the present invention provides a computer system including a central processing unit (CPU); a memory coupled to the CPU; and a computer readable storage medium coupled to the CPU. The computer readable storage medium contains instructions that are executed by the CPU via the memory to implement a method of deterring a tampering of content. The method includes the computer system signing content by using an asymmetric key cryptography. The method further includes the computer system storing the signed content in a distributed ledger which is accessible to a plurality of subscribers of the distributed ledger. The signing using the asymmetric key cryptography together with the storing the signed content in the distributed ledger provide a non-repudiable identification of an owner of the content and a non-repudiable proof of an ownership of the content.

DETAILED DESCRIPTION

Overview

Figure 1:
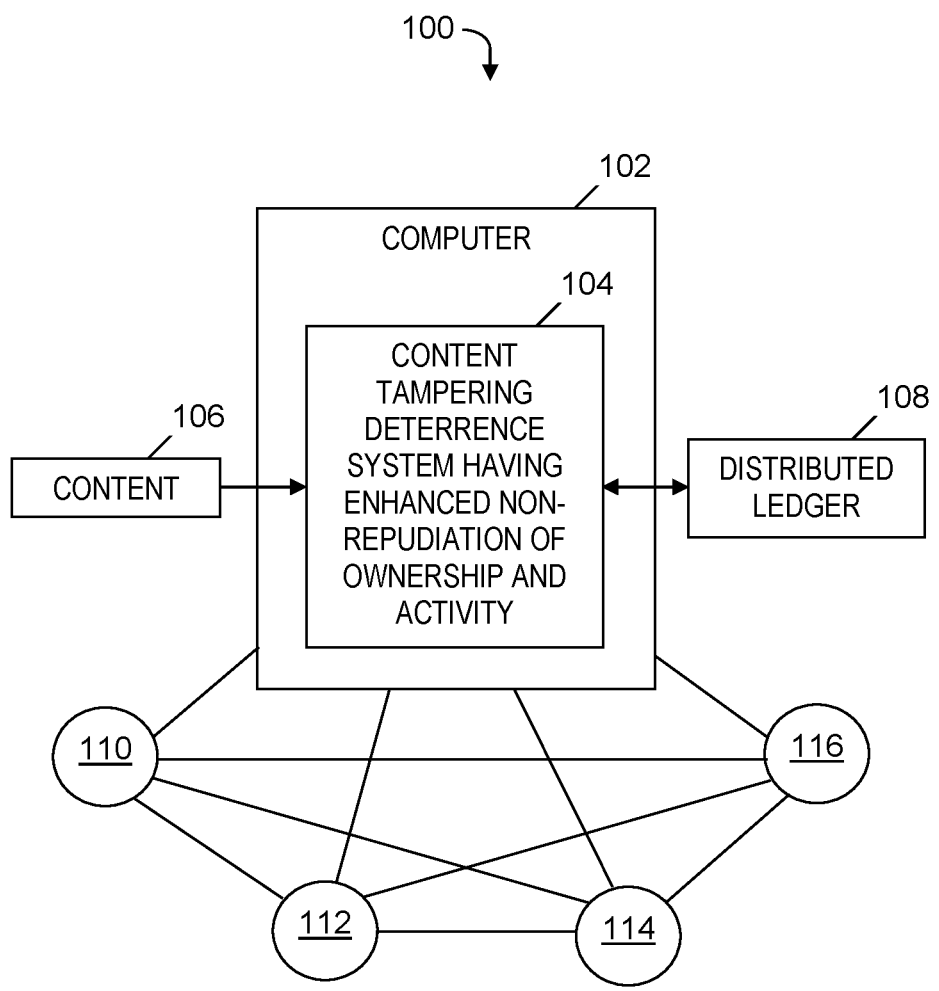
FIG. 1 is a block diagram of a system for deterring content tampering, where the system provides non-repudiation of ownership and activity, in accordance with embodiments of the present invention.

Conventional content management techniques rely on a centralized server to maintain validity of stored content (e.g., validating that the content is not modified), but the centralized server may be easily tampered with and compromised. A perpetrator who tampers with content (e.g., making an unauthorized change in the content) in a conventional content management system may not be discovered or held accountable because the system does not detect the activity that tampers with the content and/or is not able to identify or correctly identify the owner of the content tampering activity. Because the centralized server may be compromised, the perpetrator can tamper with a user identity or a record of the content tampering activity itself to hide or falsify the source of the content tampering. That is, the activity that causes the tampering in the known system and the identity of the owner of the tampering activity are repudiable.

Furthermore, conventional repositories do not make changes to content or different versions of content immediately available to multiple users of the repositories. The versions of content in conventional content management systems rely on a central authority for validation and are not cross validated. Other users of conventional content management systems do not have the ability to verify a user with a publicly available key. Information collected by conventional content management systems is not connected to other entries and the information are not encrypted in a way that accommodates entries that are connected to other entries. Still further, existing content management systems store either modified text files or proprietary database formats maintained on or by a trusted centralized server. In conventional content management systems, changes are maintained or validated by a trusted central authority and there is no consensus on changes. Changes in a conventional content management system are subject to modification; therefore, changes are subject to repudiation.

Existing content repositories are closed, private, proprietary systems that rely on obfuscation to prevent stealth, content robbery, or untracked modification. For example, source code and version control system date back to the 1960s, with rising popularity into the 1980s, when such solutions became industry best practice. These current approaches to managing content are mature and do not consider features of distributed ledgers.

Embodiments of the present invention address the unique challenges of the conventional content management techniques, which are described above, by applying a digital signature to content, encrypting the signed content, and storing the signed content and information associated with the content using a distributed tamper-resistant storage technique that employs a distributed ledger. In one embodiment, the usage of the digital signature together with encryption and the distributed ledger provides validation and non-repudiation to the content, tracking of changes to the content, ownership of the content, and ownership of changes to and other activities associated with the content, thereby deterring a perpetrator from tampering with the content because the perpetrator would not be able to successfully deny that the activity of tampering occurred or that the perpetrator is not the owner of the activity of tampering. The trackability of changes to the content also allows a detection of accidental tampering with the content. The aforementioned validation and non-repudiation are broader than features provided by digital signatures alone or distributed ledgers alone.

In one embodiment, asymmetric key encryption allows signing of content to provide proof of ownership of the content or proof of an activity associated with the content (e.g., a change made to the content or a tampering with the content). The owner or the activity is signed with the owner's asymmetric key. The key is verified at the initial submission of the content and on all later checks and proofs done relative to activities being performed relative to the content (e.g., changes being made to the content). Prior to allowing a modification to content, the user who is modifying the content is identified using the user's published asymmetric public key. Other users can verify the user who is modifying content by using the user's asymmetric public key. After the user updates the content, a new modified content entry is generated and stored, while the original content entry is not modified, and the modified content is digitally signed with the user's asymmetric private key. In one embodiment, a collection of user activities associated with stored content is connected to previous content entries.

Combining asymmetric key signing with the distributed ledger being used for distributed tamper-resistant storage enhances the cryptographic integrity of both the signing and the distributed ledger. Asymmetric key signing assures ownership of the activity, while the distributed ledger prevents a change or substitution of the signed content that used the asymmetric key.

In one embodiment, the encryption and distributed ledger-based system for tamper-resistant electronic storage disclosed herein prevents a perpetrator from updating a change to content where the change was made in the past or, at a minimum, the tampering by the perpetrator is evident and discoverable. Because the content is digitally signed in embodiments presented herein, the perpetrator is identified. The usage of the distributed ledger in one or more embodiments prevents a modification to the perpetrator's information or signature. In a case in which blockchain is used as the distributed tamper-resistant storage technique in embodiments of the present invention, the chain features of the blockchain guarantees traceability of changes made to content.

In one embodiment, the distributed ledger allows each subscriber to the distributed ledger to hold the content base, where changes to content made by any subscriber are visible and available to all subscribers, with the availability being immediate if the subscribers are connected to the distributed ledger. After a new content entry or a modified content entry is accepted by the content tampering deterrence system disclosed herein, the system broadcasts the entry to all subscribers of the repository of content and is incorporated into the other subscribers' copies of the repository after validation of the broadcasted entry.

In one embodiment, the encryption and distributed ledger-based system for tamper-resistant electronic storage protects the original authenticity of the content by not allowing any changes to the electronic file that includes the content or by allowing a finite, specified number of changes to the file (e.g., protecting the authenticity of an original cut of a movie or a director's cut of the movie).

As used herein, content means any type of file-based data, typically copyrighted, including text documents, blobs, binary files of any type of content, software source code, object code, etc. Examples of content include, but are not limited to, video files, audio files, picture files, word processing document files, spreadsheet files, disk image files, and text files.

System for Deterring Content Tampering

FIG. 1 is a block diagram of a system 100 for deterring content tampering, where the system provides non-repudiation of ownership and activity, in accordance with embodiments of the present invention. System 100 includes a computer 102 which executes a content tampering deterrence system 104 that stores content 106 and that has an enhanced non-repudiation of ownership of the stored content 106 and activity associated with the content 106 (e.g., modification of stored content 106). Content tampering deterrence system 104 uses asymmetric key cryptography to provide a digital signature for content 106 and activities associated with content 106 (e.g., a modification of content 106). Content tampering deterrence system 104 uses a distributed ledger 108 as a distributed tamper-resistant storage technique to store the digitally signed content 106. The digital signatures and the distributed ledger 108 ensure that the activity associated with content 106 was performed by the owner and that the content 106 was stored by the owner.

That is, content tampering deterrence system 104 ensures that the activity and the owner are non-repudiable.

Using the distributed ledger 108 for storing the digitally signed content 106 protects the asymmetric key signature, thereby providing a web of trust among multiple subscribers of distributed ledger 108 without a central authority. The multiple subscribers of distributed ledger 108 includes computer 102 and other computing nodes 110, 112, 114, and 116, which are interconnected in a computer network (not shown). In one embodiment, the computer network is a peer-to-peer network. Although FIG. 1 includes computer 102, and four other computing nodes 110, 112, 114, and 116 as the subscribers of distributed ledger 108, other embodiments include the subscribers of the distributed ledger 108 as including computer 102 and any number of one or more other computing nodes. In one embodiment, distributed ledger 108 and copies of distributed ledger 108 coupled to other computing nodes 110, 112, 114, and 116 are included in a decentralized electronic storage repository (not shown) which provides the non-repudiation of ownership of content 106 and activity associated with content 106.

In one embodiment, content tampering deterrence system 104 is a front end to a distributed tamper-resistant data store.

In one embodiment, by digitally signing updates to content 106 and placing them in distributed ledger 108, content tampering deterrence system 104 ensures that content 106, the tracking of updates to content 106, and ownership of content 106 and the updates to content 106 acquire validation and non-repudiation. Details of a change to content 106, whether accidental or malicious, is detectable, discoverable, and trackable by content tampering deterrence system 104. In one embodiment, since the owner of the change to content 106 makes the change, which content tampering deterrence system 104 digitally signs with the owner's asymmetric key, the owner is personally providing validation of the change, rather than relying on a trusted third party. In one embodiment, system 100 may include a trusted third party (not shown) to provide validation, but the trusted third party is not a required component of system 100.

In one embodiment, content tampering deterrence system 104 provides the asymmetric key encryption of content 106 by using an asymmetric key encryption framework which is standardized to be used together with a distributed storage such as distributed ledger 108.

In one embodiment, content tampering deterrence system 104 provides distributed storage by using a blockchain realization technology such as Hyperledger® Fabric blockchain infrastructure. Hyperledger is a registered trademark of the Linux Foundation located in San Francisco, Calif. In one embodiment, content tampering deterrence system 104 stores content 106 by using blockchain blocks, instead of modified text files or proprietary database formats used by existing content storage solutions. In one embodiment, distributed ledger 108 is implemented by using a blockchain. In one embodiment, content tampering deterrence system 104 extends the usage of distributed ledger for storing content 106 by signing content 106 using asymmetric key encryption (i.e., public/private key encryption).

In one embodiment, content tampering deterrence system 104 implements business logic of the repository for content 106 in the scaffold environment of a desired solution.

The functionality of the components shown in FIG. 1 is described in more detail in the discussion of FIG. 2, FIG. 3A, FIG. 3B, and FIG. 4 presented below.

Process for Deterring Content Tampering

Figure 2:
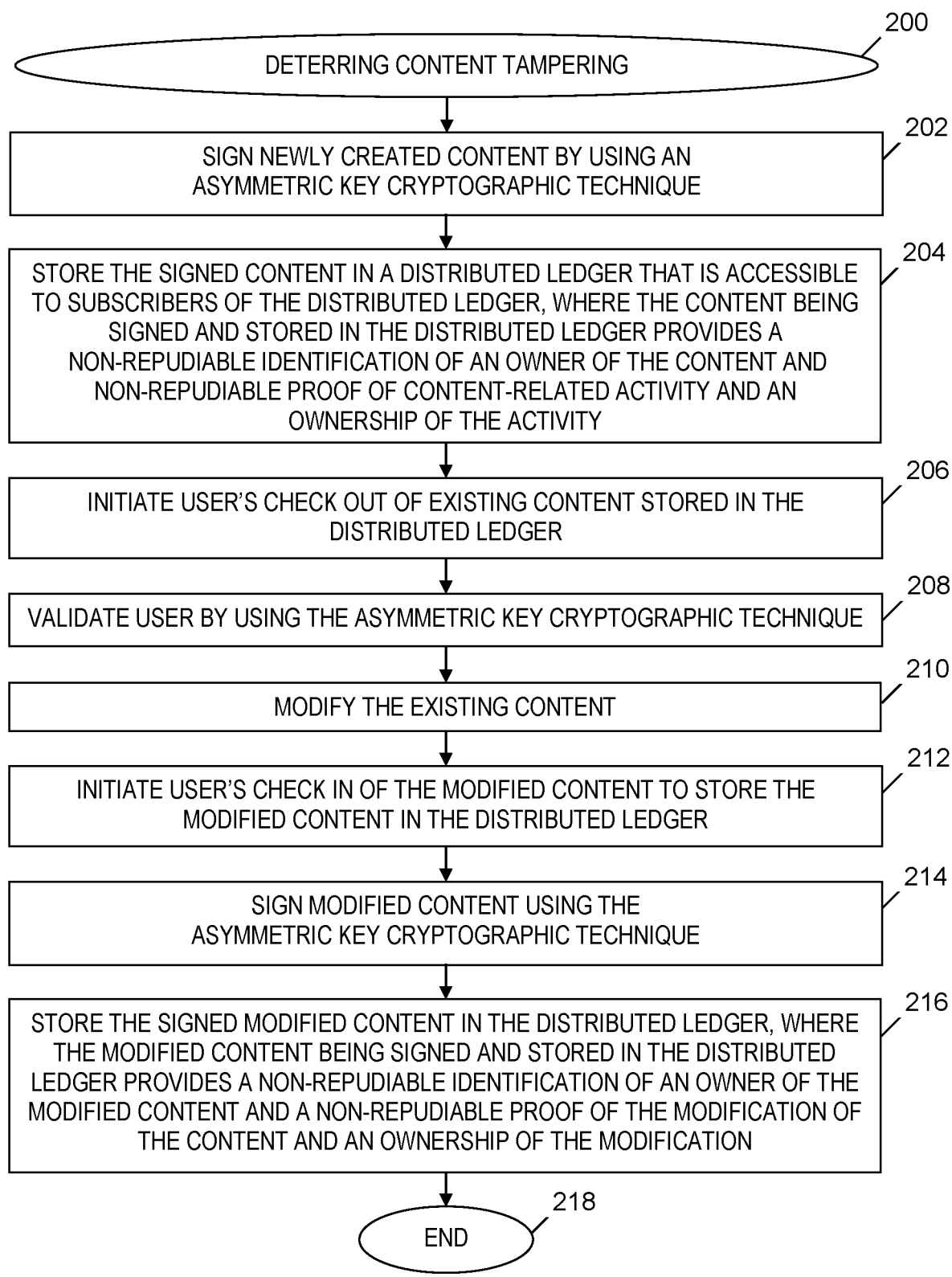
FIG. 2 is a flowchart of a process of deterring content tampering, where the process is implemented in the system of FIG. 1, in accordance with embodiments of the present invention.

FIG. 2 is a flowchart of a process of deterring content tampering, where the process is implemented in the system of FIG. 1, in accordance with embodiments of the present invention. The process of FIG. 2 starts at step 200. In step 202, content tampering deterrence system 104 (see FIG. 1) digitally signs content 106 (see FIG. 1) by using an asymmetric key cryptographic technique, where content 106 (see FIG. 1) is newly created content. In one embodiment, content tampering deterrence system 104 (see FIG. 1) uses a private key in an asymmetric cryptographic technique to digitally sign the newly created content.

In step 204, content tampering deterrence system 104 (see FIG. 1) stores the content 106 (see FIG. 1) signed in step 202 in distributed ledger 108 (see FIG. 1), whose stored content is accessible to multiple subscribers of distributed ledger 108 (see FIG. 1). The content 106 (see FIG. 1) that was signed in step 202 and stored in step 204 in distributed ledger 108 (see FIG. 1) provides a non-repudiable identification of an owner of content 106 (see FIG. 1) and a non-repudiable proof of (i) activity related to content 106 (see FIG. 1) and (ii) ownership of the activity.

Step 206 begins a subsequent phase in which the content 106 (see FIG. 1), which was stored in step 204, is later modified by a user. Hereinafter, in the discussion of the remaining steps of FIG. 2, the content 106 (see FIG. 1) already stored in step 204 is referred to as the existing content. Prior to step 206, content tampering deterrence system 104 (see FIG. 1) determines the owner of the existing content with a check of a public key using the asymmetric cryptographic technique. In step 206, content tampering deterrence system 104 (see FIG. 1) initiates a user's check out of the existing content, which is stored in distributed ledger 108 (see FIG. 1).

In step 208, content tampering deterrence system 104 (see FIG. 1) validates the user whose check out of the existing content is initiated in step 206 by using a check of a private key in the asymmetric cryptographic technique.

In step 210, content tampering deterrence system 104 (see FIG. 1) modifies the existing content to create a modification of content 106 (see FIG. 1). Hereinafter, in the discussion of FIG. 2, the modification of content 106 (see FIG. 1) created in step 210 is referred to as the modified content.

In step 212, content tampering deterrence system 104 (see FIG. 1) initiates a check in by the user of the modified content to store the modified content in distributed ledger 108 (see FIG. 1).

In step 214, content tampering deterrence system 104 (see FIG. 1) digitally signs the modified content using a private key in the asymmetric cryptographic technique.

In step 216, content tampering deterrence system 104 (see FIG. 1) stores the signed modified content in distributed ledger 108 (see FIG. 1). The signed modified content stored in step 216 in distributed ledger 108 (see FIG. 1) provides a non-repudiable identification of an owner of the modified content and a non-repudiable proof of (i) the modification of content 106 (see FIG. 1) and (ii) an ownership of the modification.

In one embodiment, content tampering deterrence system 104 (see FIG. 1) stores the content 106 (see FIG. 1) in step 204 and the signed modified content in step 216 in a blockchain by adding blocks to a blockchain content stream.

After step 216, the process of FIG. 2 ends at step 218.

In one example in which a user makes a transaction at an automated teller machine (ATM), the user uses an ATM card and a personal identification number (PIN) to make the transaction. A conventional system would store an image of the user, an identification of the user's account from the ATM card, the PIN, the time, date, and location of the transaction, etc. in a record on a centralized server, which is a single system that can be compromised or tampered with. Using system 100 in FIG. 1 and the process of FIG. 2, the information about the user's transaction is encrypted and stored in distributed ledger 108 (see FIG. 1) in step 204. The encryption protects the source information, while the storage in distributed ledger 108 (see FIG. 1) ensures that there is not a small number of central servers that can be compromised or tampered with. System 100 (see FIG. 1) is configured to detect tampering with the stored information because content tampering deterrence system 104 (see FIG. 1) detects a disagreement of the encrypted information across a distributed server base consisting of computer 102 (see FIG. 1) and the other computing nodes 110, 112, 114, and 116 (see FIG. 1) that subscribe to distributed ledger 108 (see FIG. 1).

In another example, when content is created on a screener (i.e., a DVD or Blu-ray disc on which a movie is stored), content tampering deterrence system 104 (see FIG. 1) hashes the content to create a unique hash key for the content. The receipt information may be included, thereby providing non-repudiable evidence of an authorized owner of the screener, which may be used to determine if the screener is leaked and distributed to a recipient who is not authorized to receive the screener. A conventional system would store a record of the movie information, including title, studio, copyright information, time, date, location, etc. on a centralized server. The centralized server is a single system that can be compromised or tampered with. Using the system 100 (see FIG. 1) and the process of FIG. 2, the movie information is encrypted and stored in distributed ledger 108 (see FIG. 1). The encryption protects the source information, while the storage in the distributed ledger 108 (see FIG. 1) ensures that there is not a small number of central servers that can be compromised or tampered with. If tampering with the movie information occurs, content tampering deterrence system 104 (see FIG. 1) detects the tampering by determining that the encrypted information does not agree across the distributed server base.

Examples

Figure 3A:
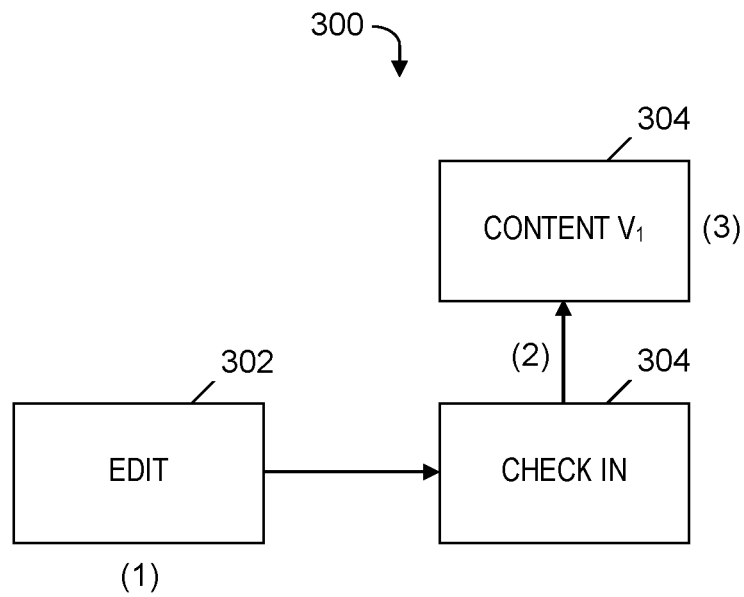
FIG. 3A is an example of using public and private keys and a blockchain to create and store new content in the process of FIG. 2, in accordance with embodiments of the present invention.

FIG. 3A is an example 300 of using public and private keys in an asymmetric cryptographic technique and a blockchain implementation to create and store new content in the process of FIG. 2, in accordance with embodiments of the present invention. Example 300 includes an edit phase 302 in which new content is created, a check in 304 of the new content, and the resulting content 306 (i.e., content $V_1$), which is the new content stored in a blockchain implementation of distributed ledger 108 (see FIG. 1). In example 300, the new content is a digital movie. At step (1), a user creates the digital movie in 4K digital format. At step (2), the user digitally signs the digital movie using a private key in an asymmetric cryptographic technique. Step (2) is included in step 202 (see FIG. 2). At step (3), content tampering deterrence system 104 (see FIG. 1) encrypts the signed digital movie and adds the encrypted, signed digital movie to the blockchain as new content by adding blocks to a blockchain content stream. Step (3) is included in step 204 (see FIG. 2).

Figure 3B:
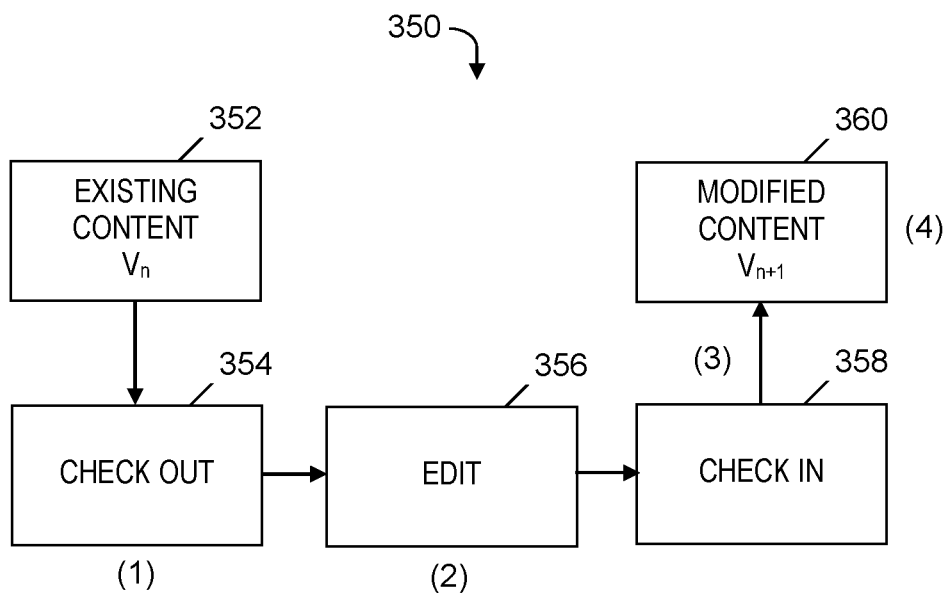
FIG. 3B is an example of using public and private keys and a blockchain to modify content and store the modified content in the process of FIG. 2, in accordance with embodiments of the present invention.

FIG. 3B is an example 350 of using public and private keys in an asymmetric cryptographic technique and a blockchain implementation to modify content and store the modified content in the process of FIG. 2, in accordance with embodiments of the present invention. Example 350 includes existing content 352 (i.e., existing content $V_n$) which is stored in a blockchain implementation of distributed ledger 108 (see FIG. 1), a check out 354 of existing content 352 from the blockchain, an edit phase 356 in which the existing content 352 is modified by a user, a check in 358 of the modified content, and resulting modified content 360 (i.e., modified content $V_{n+1}$), which is the modified content stored in the blockchain.

In example 350, existing content 352 is a digital movie stored in the blockchain. At step (1), content tampering deterrence system 104 (see FIG. 1) validates the user who is performing a check out of the digital movie by using a private key in the asymmetric cryptographic technique. Step (1) is included in step 208 (see FIG. 2). At step (2), the user edits the digital movie or replaces the digital movie with a new version of the digital movie. Step (2) is included in step 210 (see FIG. 2). At step (3), the user digitally signs the digital movie using a private key in the asymmetric cryptographic technique. Step (3) is included in step 214 (see FIG. 2). At step (4), content tampering deterrence system 104 (see FIG. 1) encrypts the signed digital movie and adds the encrypted, signed digital movie to the blockchain by adding blocks to the blockchain content stream. Step (4) is included in step 216 (see FIG. 2).

Computer System

Figure 4:
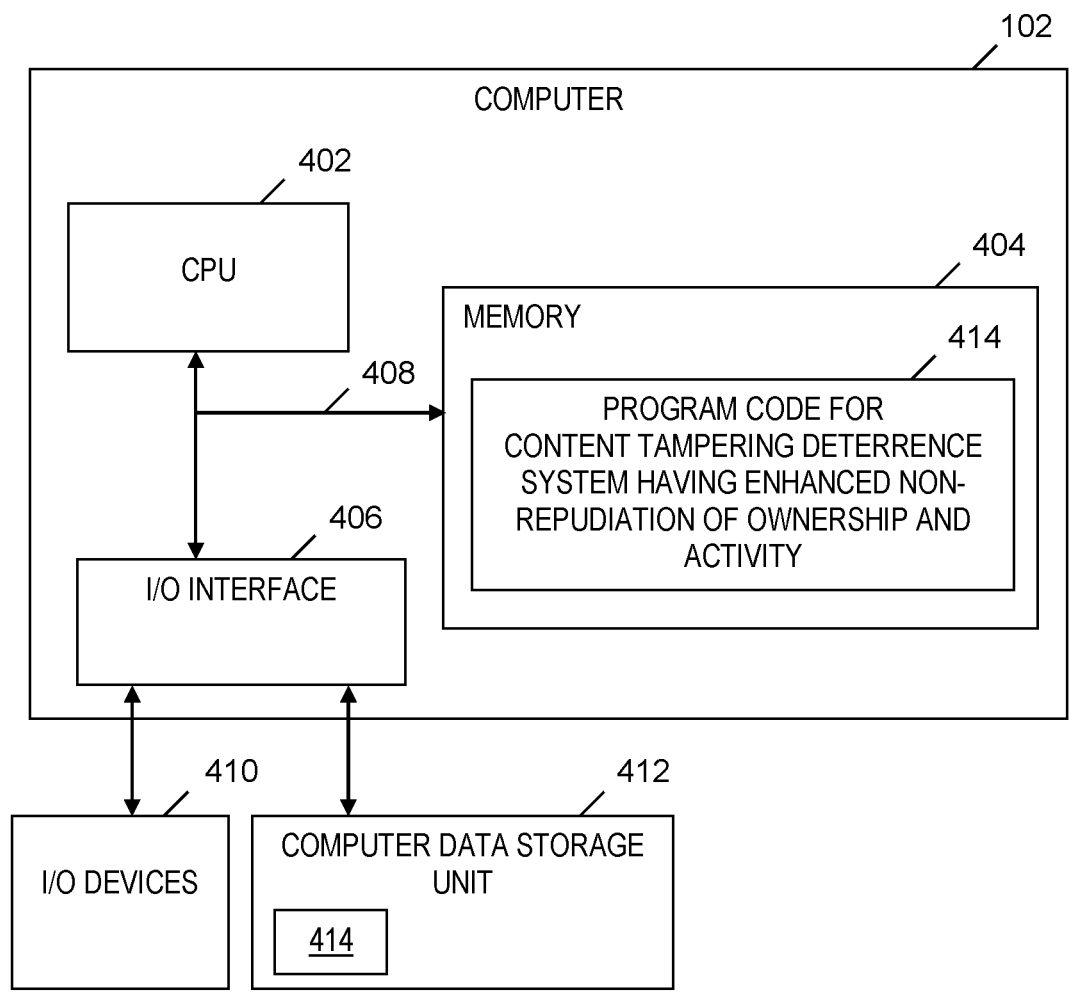
FIG. 4 is a block diagram of a computer included in the system of FIG. 1 and that implements the process of FIG. 2, in accordance with embodiments of the present invention.

FIG. 4 is a block diagram of a computer 102 included in the system of FIG. 1 and that implements the process of FIG. 2, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for content tampering deterrence system 104 (see FIG. 1) to perform a method of deterring content tampering, where the instructions are executed by CPU 402 via memory 404. CPU 402 may include a single processing unit or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer readable storage medium, which is described below. In one embodiment, computer data storage unit 412 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 404 and/or storage unit 412 may store computer program code 414 that includes instructions that are executed by CPU 402 via memory 404 to deter content tampering. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to deterring content tampering. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to deter content tampering.

Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of deterring content tampering.

While it is understood that program code 414 for deterring content tampering may be deployed by manually loading directly in client, server and proxy computers (not shown) via loading a computer readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, and then transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider can offer to create, maintain, support, etc. a process of deterring content tampering. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, switches, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of deterring a tampering of content, the method comprising:
   signing, by one or more processors, content by using a private key of an owner of the content in an asymmetric key cryptography;
   storing, by the one or more processors, the signed content in an original entry in a distributed ledger, the original entry being accessible to a plurality of subscribers of the distributed ledger, the signing using the asymmetric key cryptography together with the storing the signed content in the distributed ledger providing a non-repudiable identification of the owner of the content and a non-repudiable proof of an ownership of the content;
   signing, by the one or more processors, a modification of the content by using a private key of a user in the asymmetric key cryptography, the user having performed the modification of the content, and the user being an owner of the modification of the content;
   storing, by the one or more processors, a new entry in the distributed ledger, the new entry having the signed modification of the content, wherein the original entry having the signed content is unmodified in the distributed ledger; and
   based on the signing the modification of the content by using the private key of the user and the storing the new entry having the modification of the content in the distributed ledger, preventing, by the one or more processors, the user from successfully denying that (i) the user performed the modification of the content and (ii) the user is the owner of the modification of the content.

2. The method of claim 1, further comprising:
   identifying, by the one or more processors, the user by using a published asymmetric public key of the user; and
   permitting, by the one or more processors, the modification of the content based on the user being identified by using the published asymmetric public key of the user.

3. The method of claim 1, wherein the non-repudiable identification of the owner of the content and the non-repudiable proof of the ownership of the content are provided without a centralized server managing the content.

4. The method of claim 1, further comprising verifying, by the one or more processors, the owner of the content by multiple users using an asymmetric public key.

5. The method of claim 1, further comprising:
generating, by the one or more processors, a first entry in the distributed ledger that specifies a creation of the content in the distributed ledger and a first user as being an owner of the created content;
generating, by the one or more processors, a second entry in the distributed ledger that specifies a modification of the content in the distributed ledger and a second user as being an owner of the modified content; and
connecting, by the one or processors, the first and second entries within the distributed ledger.

6. The method of claim 1, further comprising:
accepting, by the one or more processors, an entry in the distributed ledger that includes the stored signed content; and
in response to the entry being accepted, broadcasting, by the one or more processors, the entry to multiple subscribers of the distributed ledger who access respective copies of the distributed ledger, and after the broadcasting, validating the broadcasted entry and incorporating the validated broadcasted entry into the copies of the distributed ledger.

7. The method of claim 1, further comprising:
providing at least one support service for at least one action selected from the group consisting of creating, integrating, hosting, maintaining, and deploying computer readable program code in a computer, the program code being executed by a processor of the computer to implement steps of signing the content by using the private key of the owner of the content in the asymmetric key cryptography, storing the signed content in the original entry in the distributed ledger, signing the modification of the content by using the private key of the user in the asymmetric key cryptography, storing the new entry in the distributed ledger, and preventing the user from successfully denying that (i) the user performed the modification of the content and (ii) the user is the owner of the modification of the content.

8. A computer program product for deterring a tampering of content, the computer program product comprising:
a computer readable storage medium having computer readable program code stored on the computer readable storage medium, the computer readable program code being executed by a central processing unit (CPU) of a computer system to cause the computer system to perform a method comprising:
the computer system signing content by using a private key of an owner of the content in an asymmetric key cryptography;
the computer system storing the signed content in an original entry in a distributed ledger, the original entry being accessible to a plurality of subscribers of the distributed ledger, the signing using the asymmetric key cryptography together with the storing the signed content in the distributed ledger providing a non-repudiable identification of the owner of the content and a non-repudiable proof of an ownership of the content;
the computer system signing a modification of the content by using a private key of a user in the asymmetric key cryptography, the user having performed the modification of the content, and the user being an owner of the modification of the content;
the computer system storing a new entry in the distributed ledger, the new entry having the signed modification of the content, wherein the original entry having the signed content is unmodified in the distributed ledger; and
based on the signing the modification of the content by using the private key of the user and the storing the new entry having the modification of the content in the distributed ledger, the computer system preventing the user from successfully denying that (i) the user performed the modification of the content and (ii) the user is the owner of the modification of the content.

9. The computer program product of claim 8, wherein the method further comprises:
the computer system identifying the user by using a published asymmetric public key of the user; and
the computer system permitting the modification of the content based on the user being identified by using the published asymmetric public key of the user.

10. The computer program product of claim 8, wherein the non-repudiable identification of the owner of the content and the non-repudiable proof of the ownership of the content are provided without a centralized server managing the content.

11. The computer program product of claim 8, wherein the method further comprises the computer system verifying the owner of the content by multiple users using an asymmetric public key.

12. A computer system comprising:
a central processing unit (CPU);
a memory coupled to the CPU; and
a computer readable storage medium coupled to the CPU, the computer readable storage medium containing instructions that are executed by the CPU via the memory to implement a method of deterring a tampering of content, the method comprising:
the computer system signing content by using a private key of an owner of the content in an asymmetric key cryptography;
the computer system storing the signed content in an original entry in a distributed ledger, the original entry being accessible to a plurality of subscribers of the distributed ledger, the signing using the asymmetric key cryptography together with the storing the signed content in the distributed ledger providing a non-repudiable identification of the owner of the content and a non-repudiable proof of an ownership of the content;
the computer system signing a modification of the content by using a private key of a user in the asymmetric key cryptography, the user having performed the modification of the content, and the user being an owner of the modification of the content;
the computer system storing a new entry in the distributed ledger, the new entry having the signed modification of the content, wherein the original entry having the signed content is unmodified in the distributed ledger; and
based on the signing the modification of the content by using the private key of the user and the storing the new entry having the modification of the content in the distributed ledger, the computer system preventing the user from successfully denying that (i) the user performed the modification of the content and (ii) the user is the owner of the modification of the content.

13. The computer system of claim 12, wherein the method further comprises:
- the computer system identifying the user by using a published asymmetric public key of the user; and
- the computer system permitting the modification of the content based on the user being identified by using the published asymmetric public key of the user.

14. The computer system of claim 12, wherein the non-repudiable identification of the owner of the content and the non-repudiable proof of the ownership of the content are provided without a centralized server managing the content.

\* \* \* \* \*